US009268085B2

(12) United States Patent
Huo et al.

(10) Patent No.: US 9,268,085 B2
(45) Date of Patent: Feb. 23, 2016

(54) LIQUID CRYSTAL DISPLAY DEVICE

(71) Applicant: LG DISPLAY CO., LTD., Seoul (KR)

(72) Inventors: Dong Im Huo, Gumi-si (KR); Sang Mo Yang, Incheon (KR); Kyoung Tae Kim, Seoul (KR); Dong Geun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 190 days.

(21) Appl. No.: 14/135,409

(22) Filed: Dec. 19, 2013

(65) Prior Publication Data

US 2014/0307203 A1  Oct. 16, 2014

(30) Foreign Application Priority Data

Apr. 12, 2013 (KR) .......................... 10-2013-0040209

(51) Int. Cl.
*G02F 1/13357* (2006.01)
*F21V 8/00* (2006.01)

(52) U.S. Cl.
CPC .................................... *G02B 6/0088* (2013.01)

(58) Field of Classification Search
CPC .................. G02B 6/0088; G02F 1/133308
USPC .......................................................... 349/65
See application file for complete search history.

(56) References Cited

U.S. PATENT DOCUMENTS

| 5,999,238 A * | 12/1999 | Ihara ......................... G02B 5/20 349/57 |
| 2009/0322989 A1* | 12/2009 | Kim .................. G02F 1/133308 349/65 |
| 2013/0322113 A1 | 12/2013 | Yang |

FOREIGN PATENT DOCUMENTS

| KR | 10-2009-0043799 A | 5/2009 |
| TW | M437994 U1 | 9/2012 |

* cited by examiner

*Primary Examiner* — Dung Nguyen
*Assistant Examiner* — Tai Duong
(74) *Attorney, Agent, or Firm* — Birch, Stewart, Kolasch & Birch, LLP

(57) ABSTRACT

A liquid crystal display device including a liquid crystal panel in a display area and a non-display area; a plurality of optical sheets under the liquid crystal panel; a light guide plate under the optical sheets; a light source configured to apply light to the light guide plate; and a support main connected to the liquid crystal panel, the optical sheets and the light guide plate and including a first support guide in back of the liquid crystal panel; a second support guide in back of the optical sheets and extending from a side surface of the first support guide; and a third support guide extending from a side surface of the second support guide. An inside portion of the third support guide is narrower than an outside portion of the third support guide.

20 Claims, 14 Drawing Sheets

LIQUID CRYSTAL DISPLAY DEVICE

The present application claims priority under 35 U.S.C. §119(a) of Korean Patent Application No. 10-2013-0040209 filed on Apr. 12, 2013, which is hereby incorporated by reference in its entirety.

BACKGROUND

1. Field of the Disclosure

The present application relates to a liquid crystal display device.

2. Description of the Related Art

Recently, a variety of flat panel display devices with reduced weight and volume have been developed as an alternative to cathode ray tubes (CRT) which are heavy and large. The flat panel display devices include liquid crystal display (LCD) devices, field emission display (FED) devices, plasma display panels (PDPs), electroluminescence devices and so on.

Advantages of the PDPs include a simple manufacture process, lightness and thinness, and easy adaptability for providing a large-sized screen. In view of these points, the PDPs attract public attention. However, the PDPs have serious problems such as low light emission efficiency, low brightness and high power consumption. Thin film transistor LCD devices are widely used as the flat display devices, but have disadvantages such as a narrow viewing angle and a low response time. The electroluminescence display devices are classified into an inorganic light emitting display device and an organic light emitting display device on the basis of the formation material of a light emission layer. The organic light emitting display device corresponding to a self-illuminating display device has features such as high response time, high light emission efficiency, high brightness and wide viewing angle. Such flat display devices are being developed into a large-sized model with high definition. Moreover, in order to enlarge a viewer's sense of immersion in a displayed imaged, it is necessary to realize a narrow bezel.

FIG. 1 is an exploded perspective view showing an LCD device according to related art.

Referring to FIG. 1, the LCD device according to related art includes a liquid crystal panel 20, a backlight unit 31, a support main 80, a cover bottom 90 and a top case 10.

The liquid crystal panel 20 is used to play an important part of an image display. To this end, the liquid crystal panel 20 includes first and second substrates combined to face each other with a liquid crystal layer therebetween. A printed circuit board (PCB) 30 is connected to one edge of the liquid crystal panel 20 via at least one connection member. The backlight unit 31 is disposed in a rear of the liquid crystal panel 20. Also, the backlight unit 31 includes: a lamp 70 disposed along at least one edge of the support main 80; a reflective sheet of a white or silver color disposed on the cover bottom 90; a light guide plate 50 disposed on the reflective sheet 60; and a plurality of optical sheets 40 stacked on the light guide plate 50. The lamp 70 is positioned at one side surface of the light guide plate 50. In a state that the edges of the liquid crystal panel 20 and the backlight unit 31 are surrounded with the support main having a quadrilateral rim shape, the top case 10 surrounding the edges of the liquid crystal panel 20 and the cover bottom 90 covering the rear surface of the backlight unit 31 are combined with each other and united to form a single body, using the support main 80 as a medium. As such, light emitted from the lamp 70 is converted into high quality light with uniform brightness by entering an incidence surface, e.g., a front surface, of the light guide plate 50, being refracted toward the liquid crystal panel 20, and passing through the optical sheets 40, before being irradiated onto the liquid crystal panel 20. In accordance therewith, the liquid crystal panel externally displays images.

Nowadays, LCD devices are gradually being widened to be used as monitors of portable and desk-top computers and televisions of a wall-tapestry type. As such, an LCD device with a wide display area and largely reduced weight and volume has been actively researched. To provide an edge corresponding to a non-illuminating area except an effective illuminating area, it is necessary to design a narrow bezel. Although efforts for realizing the narrow bezel and light-weighted LCD device are being tried, there are many difficulties in realizing the narrow bezel in a lightweight LCD device.

FIG. 2 is a cross-sectional view showing an LCD device according to related art.

As shown in FIG. 2, the width of a support main 80 can be reduced to realize a narrow bezel. In this case, the ability of the support main to provide sufficient support for the light guide plate 50 deteriorates. In detail, the reduced width of the support main 80 enables a contact area of the support main 80 and the light guide plate 50 in a circle region marked by a dotted line to be reduced. As such, the supporting force applied from the support main 80 to the light guide plate 50 becomes weaker. The weakening of the light guide plate 50 can cause it to be moved from a desired position, and furthermore picture quality can deteriorate. Moreover, because the edge region of the liquid crystal panel is also reduced, light leaks through the circle region marked by the dotted line. In accordance therewith, picture quality can largely deteriorate, and components within the non-display area can be viewed from the exterior.

BRIEF SUMMARY

Accordingly, embodiments of the present application are directed to an LCD device that substantially obviates one or more of problems due to the limitations and disadvantages of the related art.

The embodiments relate to an invention which provides a support main adapted to evenly transfer light output from a light guide plate to an edge area of an optical sheet.

Also, the embodiments relate to an invention adapted to prevent light output from a light guide plate through an edge region of an optical sheet.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a liquid crystal display device includes a liquid crystal panel in a display area and a non-display area; a plurality of optical sheets under the liquid crystal panel; a light guide plate under the optical sheets; a light source configured to apply light to the light guide plate; and a support main connected to the liquid crystal panel, the optical sheets and the light guide plate and including a first support guide in back of the liquid crystal panel; a second support guide in back of the optical sheets and extending from a side surface of the first support guide; and a third support guide extending from a side surface of the second support guide. An inside portion of the third support guide is narrower than an outside portion of the third support guide.

In the LCD device in accordance with present embodiment, the second support guide is in the non-display area, and the third support guide is in the display area.

In the LCD device in accordance with present embodiment, the third support guide has a sloped front surface.

In the LCD device in accordance with present embodiment, the first support guide include: a first surface corresponding to a front surface of the first support guide; a second surface corresponding to a front inner side surface of the first support guide; and a third surface corresponding to a rear inner side surface of the first support guide, the second support guide protrudes from the second surface and includes: a fourth surface corresponding to a front surface of the second support guide; a fifth surface corresponding to an inner side surface of the second support guide; and a sixth surface corresponding to a rear surface of the second support guide, the third support guide protrudes from the fifth surface and includes: a seventh surface corresponding to a front surface of the third support guide; an eighth surface corresponding to an inner side surface of the third support guide; and a ninth surface corresponding to a rear surface of the third support guide, the liquid crystal panel is connected to the first surface, the optical sheets are connected to the fourth surface, and the light guide plate is in back of the sixth surface and the ninth surface.

In the LCD device in accordance with present embodiment, the seventh surface is formed to have a stair shape away from the optical sheets toward the inside of the optical sheets.

In the LCD device in accordance with present embodiment, the light source is adjacent to a side surface of the light guide plate and included in a light source assembly on the third surface.

The LCD device in accordance with present embodiment further includes a first pad between the support main and the light guide plate, under the sixth and ninth surfaces, and connected to the light guide plate.

In the LCD device in accordance with present embodiment, the total thickness of the optical sheets is the same as the thickness of the second surface.

In the LCD device in accordance with present embodiment, the first, second, and third support guides are in a single component and provided as the support main.

In the LCD device in accordance with present embodiment, the second and third support guides are perpendicular to the first support guide.

In the LCD device in accordance with present embodiment, the third support guide is tinged with white or formed from a transparent material.

The LCD device in accordance with present embodiment further includes a fourth support guide including a first guide portion connected to an outside side surface the first support guide, and a second guide portion extending from the first support guide.

The LCD device in accordance with present embodiment further includes a third guide portion extending from the second guide portion.

In the LCD device in accordance with present embodiment, the optical sheets are connected to the second guide portion.

In the LCD device in accordance with present embodiment, the second guide portion is in the non-display area of the liquid crystal panel.

In the LCD device in accordance with present embodiment, the optical sheets are connected to the third guide portion.

The LCD device in accordance with present embodiment further includes a second pad interposed between the fourth support guide and the liquid crystal panel and support the liquid crystal panel.

In the LCD device in accordance with present embodiment, the fourth support guide and the support main are formed in a single component.

In the LCD device in accordance with present embodiment, the third support guide has a sloped rear surface.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
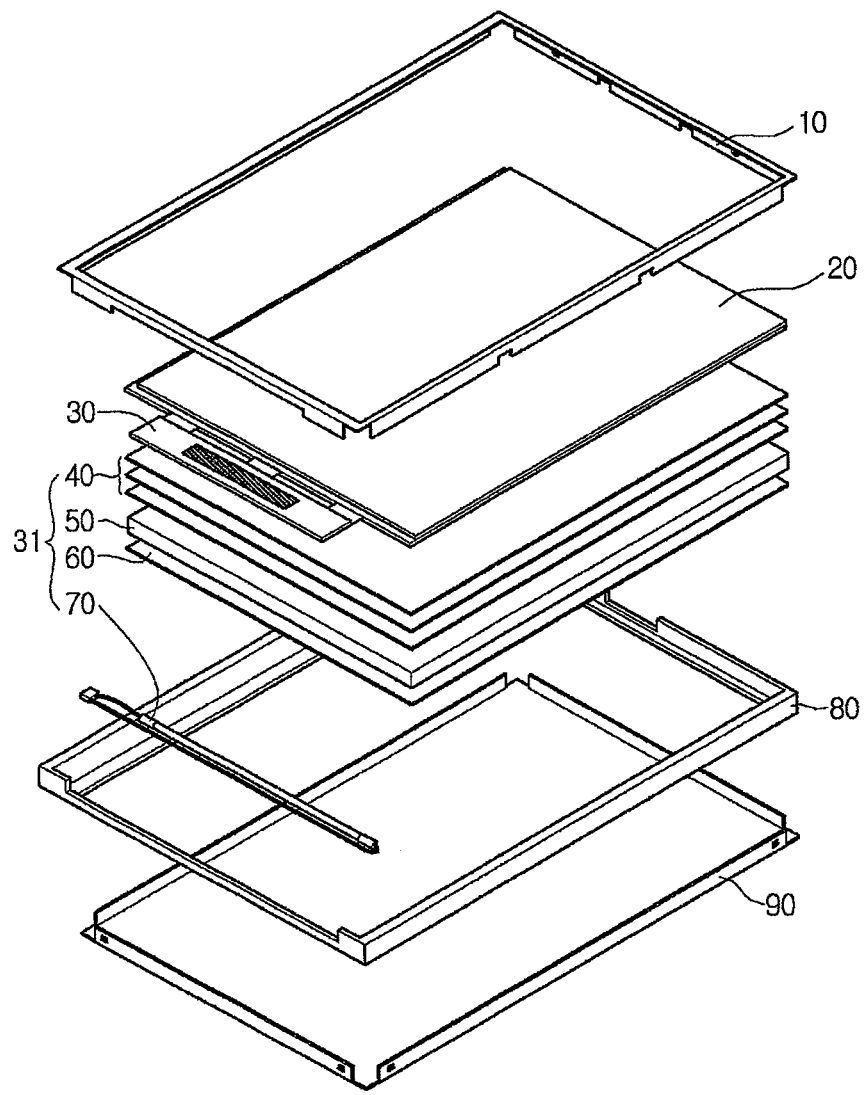
FIG. 1 is an exploded perspective view showing an LCD device according to related art.
Figure 2:
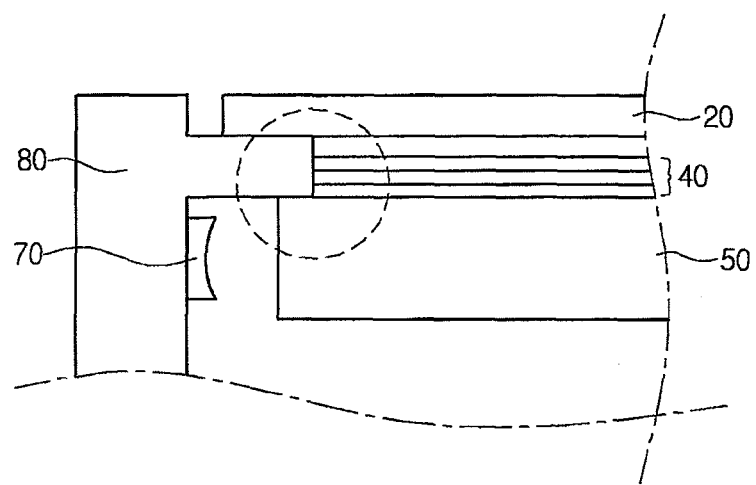
FIG. 2 is a cross-sectional view showing an LCD device according to related art.

Reference will now be made in detail to the embodiments of the present disclosure, examples of which are illustrated in the accompanying drawings. These embodiments introduced hereinafter are provided as examples in order to convey the spirit of the invention to a person of ordinary skill in the art. Therefore, the illustrated embodiments might be embodied in a different shape, and are not limited to the embodiments described here. In the drawings, the size, thickness and so on of a device can be exaggerated for convenience of explanation. Wherever possible, the same reference numbers will be used throughout this disclosure including the drawings to refer to the same or like parts.

Figure 3:
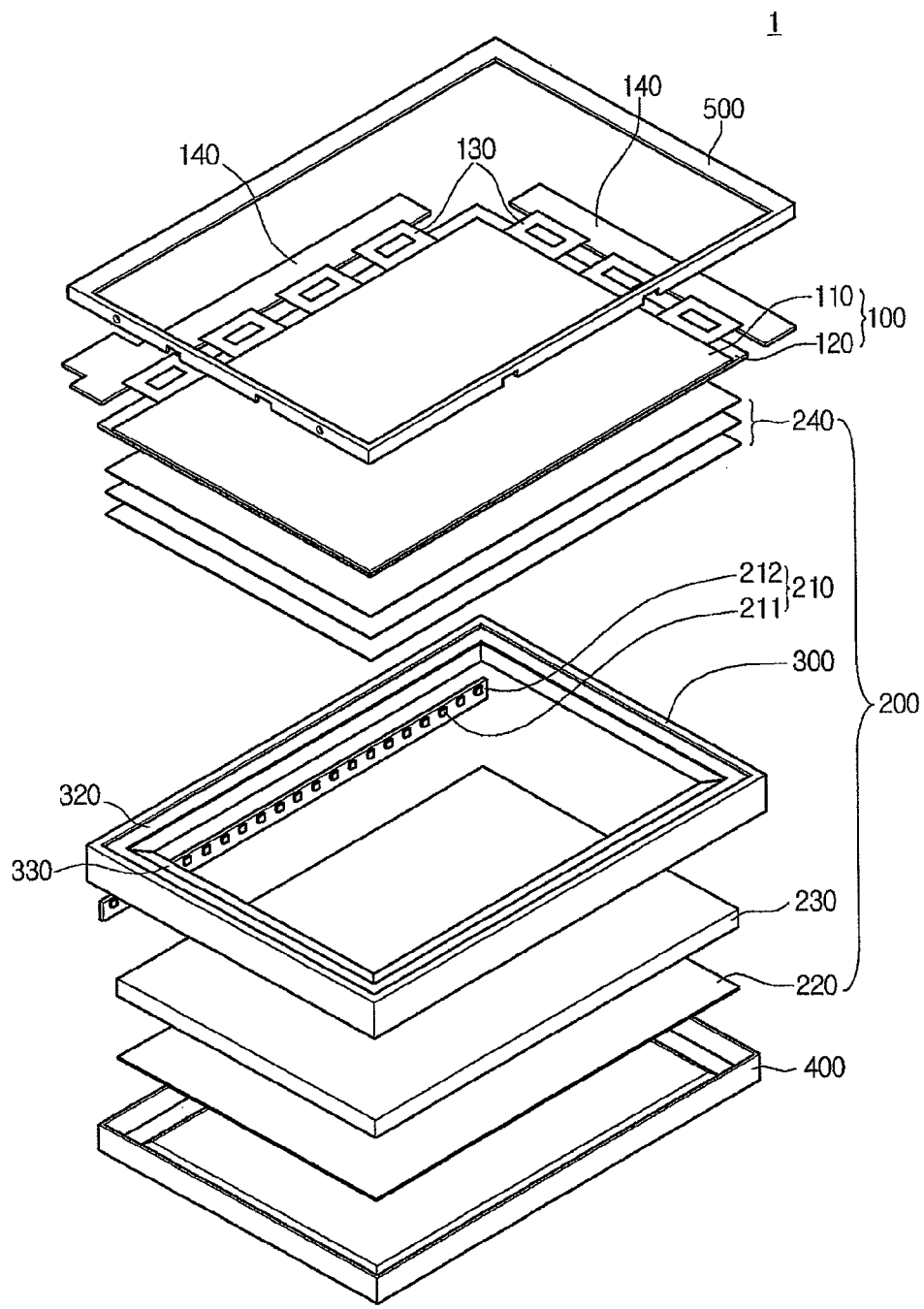
FIG. 3 is an exploded perspective view showing an LCD device according to a first embodiment of the present disclosure.

FIG. 3 is an exploded perspective view showing an LCD device according to a first embodiment of the present invention.

Referring to FIG. 3, the LCD device 1 can include a liquid crystal panel 100, a backlight unit 200, a support main 300, a cover bottom 400 and a top case 500.

The liquid crystal panel 100 can be used to display images and can include first and second substrates 110 and 120 which are combined to face each other with a liquid crystal layer therebetween. An inner surface of the first substrate 110, which is an array substrate or a lower substrate, is defined into a plurality of pixels by a plurality of gate lines and a plurality of data lines crossing each other. Also, thin film transistors TFTs are formed at intersections of the plural gate lines and the plural data lines and connected to respective pixel electrodes. Meanwhile, color filters opposite to the pixels are formed on an inner surface of the second substrate 120, which is an upper substrate or a color filter substrate. The color filters can include, for example, red, green and blue color filters. Also, a black matrix opposite to and screening non-display components of the first substrate 110, which includes the gate lines, the data lines and the thin film transistors, is included in the second substrate 120. If the LCD device 1 is driven into a vertical electric field mode, a common electrode covering the color filters and the black matrix can be additionally formed on the second substrate 120. Further, polarizing plates selectively transmitting only fixed light can be attached to outer surfaces of the first and second substrates 110 and 120. Furthermore, a printed circuit board 140 can be connected along at least one edge of the liquid crystal panel 100 using at least one connection member, such as a flexible circuit board or a tape carrier package (TCP), as a medium. The printed circuit board 140 is furled toward and comes in close contact with a side surface of the support main 300 and/or a rear surface of the cover bottom 400.

The backlight unit 200 disposed on a rear surface of the liquid crystal panel 100 can be used to apply light to the liquid crystal panel 100. To this end, the backlight unit 200 can include a light emitting diode (LED) assembly 210, a reflective sheet 220 being tinged white or silver color, a light guide plate 230 disposed on the reflective sheet 220, and a plurality of optical sheets 240 stacked on the light guide plate 230.

The LED assembly 210 is disposed to face an incidence surface, e.g., a front surface, of the light guide plate 230. Also, the LED assembly 210 can include a plurality of LEDs 211 and a printed circuit board 212 including the LEDs 211 which are arranged at fixed intervals. The plurality of LEDs 211 can include red, green and blue LEDs which emit red, green and blue light toward the incidence surface of the light guide plate 230 which is positioned at a front direction. The pluralities of red, green and blue LEDs can be turned on one at a time to allow white light to be generated through a color mixture phenomenon. The LED assembly 210 can be disposed on one side surface, e.g., a left side surface, of the light guide plate 230 as shown in the drawing, but it is not limited to this. The LED assembly 210 can be disposed on another side surface, e.g., a right side surface, of the light guide plate 230 or a side surface with shortest width among the side surfaces of the light guide plate 230.

Meanwhile, a white LED configured to include an LED chip emitting red, green and blue lights can be used as each of the LEDs 211, in order to generate white light in each of the LEDs 211. In a different way, another white LED configured to include a chip emitting white light can be used as each of the LEDs 211, to generate complete white light in each of the LEDs 211. The pluralities of red, green and blue LEDs 211 can be attached to the PCB 212 in a cluster. The plurality of LEDs 211 attached to the PCB 212 can be uniformly arranged in a single row (or line) or a plurality of rows (or lines).

The PCB 212 can be a metal core PCB to radiate heat in the LCD Device 1. The metal core PCB has a high thermal conductivity and can rapidly discharge high-temperature heat generated in the plurality of LEDs 211 to the exterior of the LCD Device 1. If the metal core PCB is used as the PCB 212, an insulation layer, for example, can be formed from a polyimide resin or included in the PCB 212 in order to electrically insulate wiring patterns from the metal core.

The light guide plate 230 can disperse light emitted from the LEDs 211 and apply two-dimensional light to the liquid crystal panel 100. More specifically, light emitted from the LEDs 211 progresses toward and collides with the inner side of the light guide plate 230 and is entirely reflected several times. As such, light emitted from the LEDs 211 can be evenly dispersed throughout the light guide plate 230. In accordance therewith, two-dimensional light can be applied to the liquid crystal panel 100. In order to apply uniformly two-dimensional light to the liquid crystal panel 100, a rear surface of the light guide plate 230 can include a fixed pattern. The fixed pattern for guiding light entered into the inside of the light guide plate 230 can be in a variety of shapes, such as an elliptical pattern, a polygonal pattern, a hologram pattern and so on. Such a fixed pattern can be formed on the rear surface of the light guide plate 230 through, for example, a printing procedure or an injection molding procedure.

The reflective sheet 220 can be disposed on the rear surface of the light guide plate 230 to reflect light from the rear surface of the light guide plate 230 toward the light crystal panel 100. As such, brightness of light emitted by the LCD Device 1 can be enhanced.

The plurality of optical sheets 240 stacked on the light guide plate 230 can include, for example, a diffusion sheet and at least one light concentration sheet to scatter and concentrate light, which passes though the light guide plate 230, to apply more uniform two-dimensional-light to the liquid crystal panel 100.

The light crystal panel 100 and backlight unit 200 in the LCD Device 1 can be modularized by the top case 500, the support main 300 and the cover bottom 400.

More specifically, the top case 500 can be formed in a quadrilateral rim which has a sectional surface bent in a shape of "⌐" and cover four edges of the upper surface of the liquid crystal panel 100. In other words, the front surface of the top case 500 is opened. As such, images displayed on the liquid crystal panel 100 can be externally exposed through the opened front surface of the top case 500.

The cover bottom 400, on which the liquid crystal panel 100 and the backlight unit 200 are placed, can become a foundation for modularizing all of structural components of the LCD device 1. To this end, the cover bottom 400 can be formed in a quadrilateral plate with a horizontal surface.

The support main 300 can define positions of the liquid crystal panel 100 and the backlight unit 200 disposed in the inside of the liquid crystal display panel 100. To this end, the support main 300 can be formed in a quadrilateral rim shape with support guides 310, 320 and 330 on which the liquid crystal panel 100 is placed. In other words, the support main 300 can be formed in such a manner as to surround the edges of the liquid crystal panel 100 and the light guide plate 230 of the backlight unit 200.

Such a support main 300 can have a fixing region, to which the LED assembly 210 is fastened using, for example, an attaching process, the fixing region being formed in at least one of edges of the support main 300. As such, light emitted from the plurality of LEDs 211 of the LED assembly 210 can enter the incidence surface of the light guide plate 230. In other words, the plurality of LEDs 211 of the LED assembly 210 can be opposite the incidence surface of the light guide plate 230.

In addition, the top case is, for example, a case top or a top cover. The support main 300 is, for example, a guide panel, a main support or a mold frame. The cover bottom 400 is, for example, a bottom cover or a lower cover.

The backlight unit 200 in the LCD Device 1 can correspond to a commercial side light type. The LEDs 211 attached to the PCB 212 can be arranged in a multi-layer structure, as needed. Also, a plurality of pairs of LED assemblies 210 can be used in the backlight unit 200. For example, one pair of LED assemblies 210 as shown in FIG. 3 can be arranged opposite each other by being positioned at both edges of the cover bottom 400 (or the support main 300) which are opposite to each other.

Figure 4:
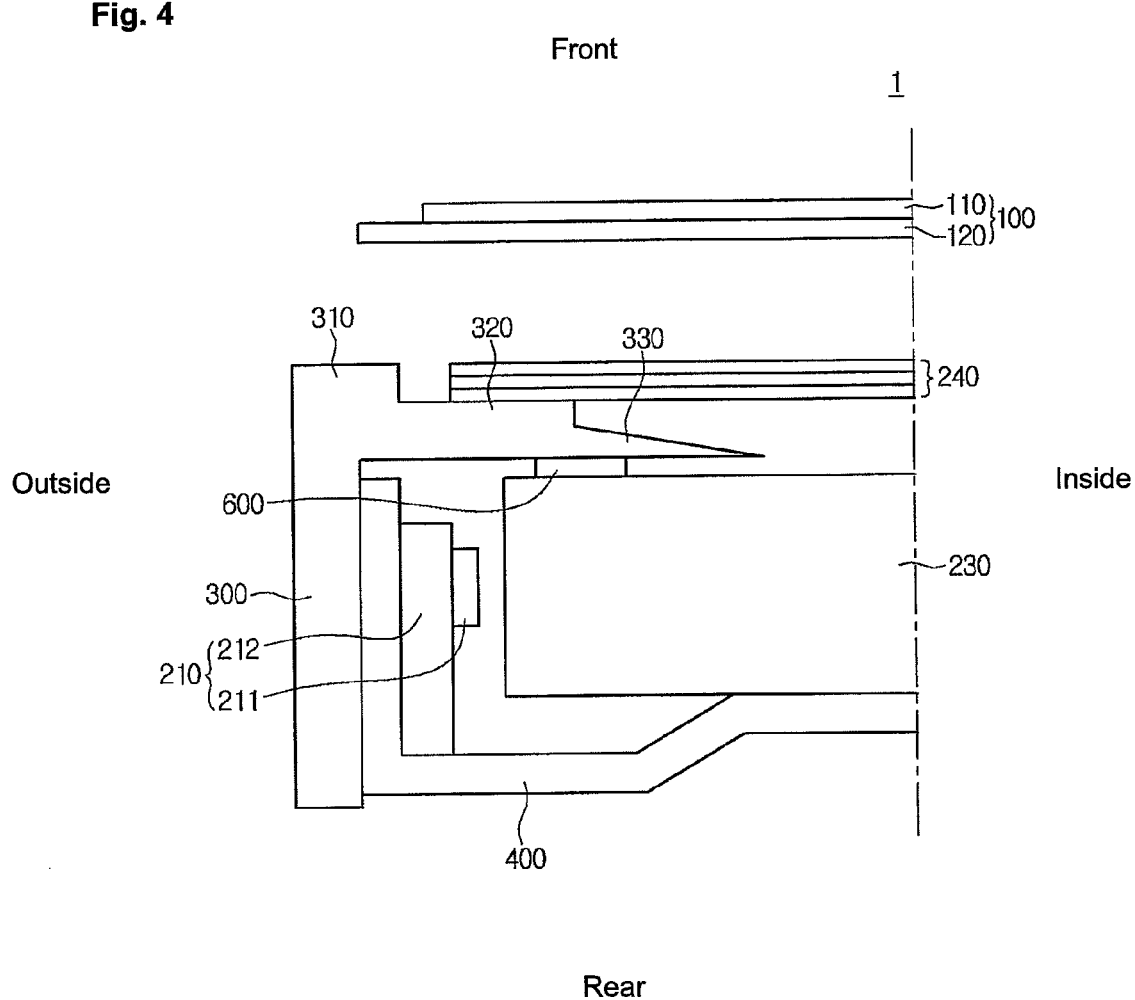
FIG. 4 is a cross-sectional view showing the LCD device according to the first embodiment of the present disclosure.

FIG. 4 is a cross-sectional view showing an LCD device according to the first embodiment of the present disclosure.

Referring to FIG. 4, the support main 300 according to the first embodiment of the present disclosure can include a first support guide 310, a second support guide 320 and a third support guide 330. An upper surface of the first support guide 310 can be connected to the liquid crystal panel 100. An upper surface of the second support guide 320 can be connected to the optical sheets 240. The support main 300 can be disposed to surround the light guide plate 230 and the cover bottom 400. As such, the second and third support guides 320 and 330 can be in front of the light guide plate 230. Also, the LED assembly 210 can be disposed in the inside of the cover bottom 400. In a different way, the cover bottom 400 can be combined with the support main 300 in such a manner as to surround the support main 300. In this case, the LED assembly 210 can be disposed, for example, on an inner side surface of the support main 300. The LED assembly 210 can include the plurality of LEDs 211 and the PCB 212. The plurality of LEDs 211 can be attached to the PCB 212 to supply light to the incidence surface of the light guide plate 230. Also, each of the plurality of LEDs 211 can be spaced apart from the incidence surface of the light guide plate 230 by fixed distances, respectively.

Meanwhile, the optical sheets 240 can be disposed on the upper surface of the second support guide 320. As such, the optical sheets 240 and the light guide plate 230 can be arranged in such a manner as to be separate from each other.

In comparison to LCD devices in related art that include a rear surface of a cover bottom that can be unevenly formed unlike a flat surface, the rear surface of the cover bottom 400 in the first embodiment of the current invention can be formed through a prominence-and-depression process or an embossing process to minimize deformation of the cover bottom 400.

Figure 5:
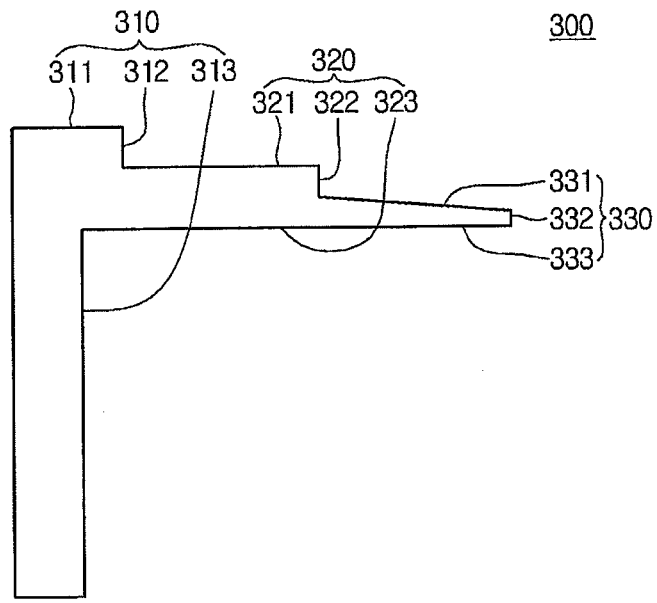
FIG. 5 is a cross-sectional view showing a support main in the LCD device according to the first embodiment of the present disclosure.

FIG. 5 is a cross-sectional view showing a support main according to the first embodiment of the present disclosure.

Referring to FIG. 5, the support main 300 can include first through third support guides 310, 320 and 330 formed in a single body.

The first support guide 310 can include first through third surfaces 311, 312 and 313. The second support guide 320 can include fourth through sixth surfaces 321, 322 and 323. The third support guide 330 can include seventh through ninth surfaces 331, 332 and 333.

The first support guide 310 corresponds to a side wall formed in circumference of the support main 300 which can surround the backlight unit 200 (refer to FIG. 3). The second support guide 320 can protrude perpendicularly from an upper portion of the inner side surface of the first support guide 310. The third support guide 330 can extend from the second support guide 320 in a perpendicular direction from the first support guide 310. The first through third support guides 310, 320 and 330 can be formed to have stair differences therebetween. More specifically, the first support guide 310 can include: the first surface 311 corresponding to its upper surface; the second surface 312 being perpendicular to the first surface 311; and the third surface 313 being perpendicular to the first surface 311 and opposite to the LED assembly 210. The second support guide 320 can protrude perpendicularly from the second surface 312 and can include: the fourth surface 321 corresponding to an upper surface of the second support guide 320; the fifth surface 322 being perpendicular to the fourth surface 321; and the sixth surface 323 corresponding to the rear surface of the second support guide 320. The third support guide 330 can protrude perpendicularly from the fifth surface 322 and can include: the seventh surface 331 corresponding to an upper surface of the third support guide 330; the ninth surface 333 corresponding to the rear surface of the third support guide 330; and the eighth surface 332 being perpendicular to the ninth surface 333.

FIGS. 6 through 10 are cross-sectional views showing various examples of the support main.

Figure 6:
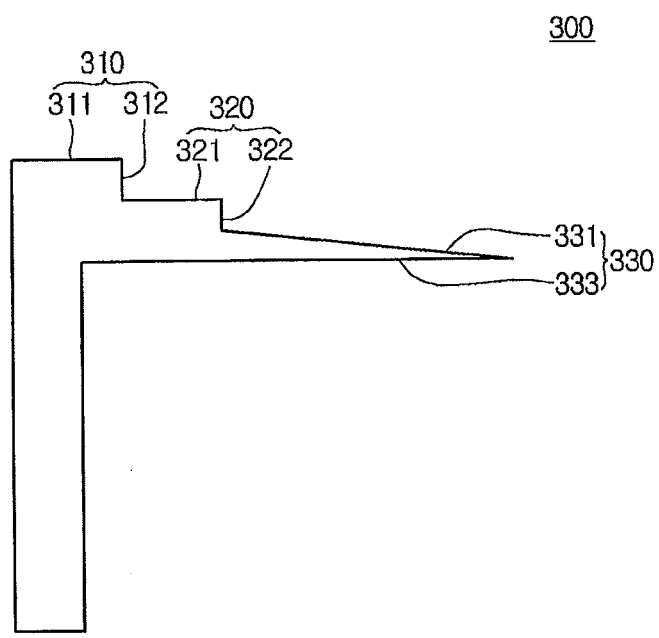
FIGS. 6 through 10 are cross-sectional views showing various examples of the support main.

Referring to FIG. 6, the support main 300 can include first through third support guides 310, 320 and 330. The first support guide 310 can include: the first surface 311 corresponding to an upper surface of the first support guide 310; the second surface 312 being perpendicular to the first surface 311 and corresponding to a top portion of an inner side surface of the first support guide 310; and the third surface 313 being perpendicular to the first surface 311 and corresponding to a bottom portion of an inner side surface of the first support guide 310. The second support guide 320 can include the fourth and fifth surfaces 321 and 322. The third support guide 330 can include: the seventh surface 331 being sloped; and the ninth surface 333 corresponding to the rear surface of the second support guide 320. The third support guide 330 as shown in FIG. 6 does not have the eighth surface 332, unlike in FIG. 5. In other words as shown in FIG. 6, ends of the seventh and ninth surfaces 331 and 333 can be joined with each other so that the eighth surface 332 as shown in FIG. 5 is not formed.

Figure 7:
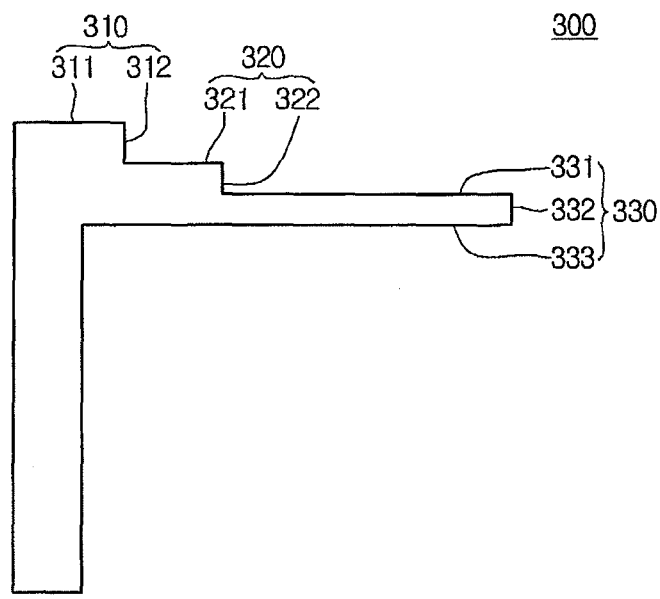

Referring to FIG. 7, the support main 300 can include first through third support guides 310, 320 and 330. The first support guide 310 can include the first and second surfaces 311 and 312, and the second support guide 320 can include the fourth and fifth surfaces 321 and 322. The third support guide 330 can include: the seventh surface 331 being unsloped; the ninth surface 333 corresponding to the rear surface of the third support guide 330; and the eight surface 332 being perpendicular to the seventh and ninth surfaces 331 and 333. The seventh surface 331 of the third support 330 is flat, unlike in FIG. 6.

In other words, the second surface 312 of the first support guide 310 and the fifth surface 322 of the second support guide 320 are formed in the support main 300. As such, the first through third support guides 310, 320 and 330 can be formed with stair differences therebetween.

Figure 8:
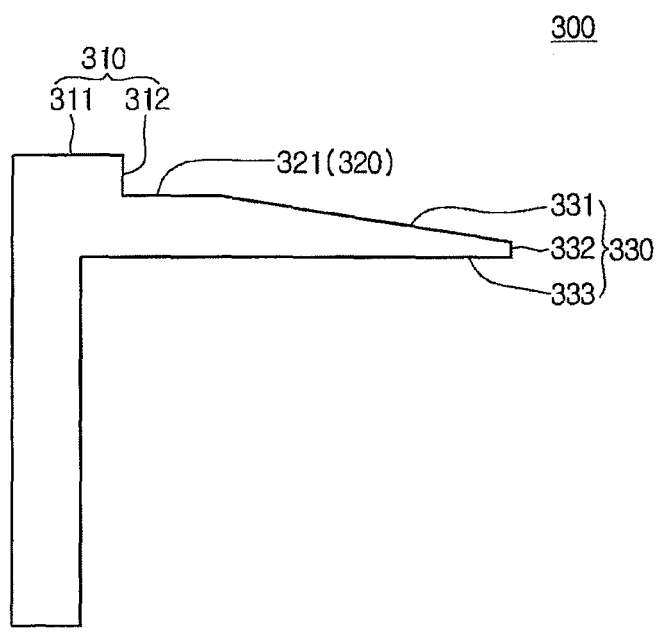

Referring to FIG. 8, the support main 300 can include first through third support guides 310, 320 and 330. The first support guide 310 can include the first and second surfaces 311 and 312, and the second support guide 320 can include the fourth surface 321. The third support guide 330 can include: the seventh surface 331 being sloped; the ninth surface 333 corresponding to the rear surface of the third support guide 330; and the eight surface 332 being perpendicular to the ninth surface 333. The second support guide 320 is formed without having the fifth surface 322, unlike in FIG. 7, as a result of the end of the fourth surface 321 of the second support guide 320 being joined with the end of the seventh surface 331 of the third support guide 330.

The seventh surface 331 of the third support guide 330 can be, for example, a sloped surface. Alternatively, the seventh surface 331 can be unsloped, as shown in FIG. 7. Also, the third support guide 330 can be formed without the eighth surface 332 (refer to FIG. 6).

Figure 9:
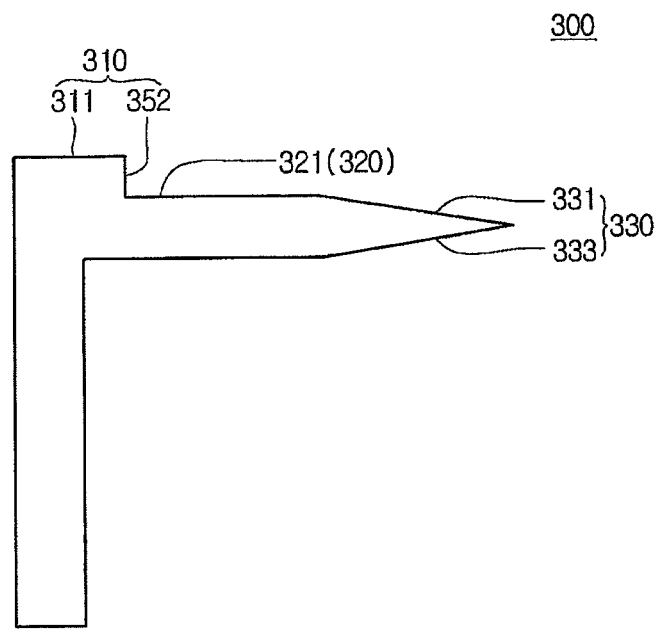

Referring to FIG. 9, the support main 300 can include first through third support guides 310, 320 and 330. The first support guide 310 can include the first and second surfaces 311 and 312, and the second support guide 320 can include the fourth surface 321. The third support guide 330 can include the seventh surface 331 being sloped, and the ninth surface 333 corresponding to the rear surface of the third support guide 330 and having a slope opposite to the slope of the seventh surface 331. The seventh and ninth surfaces 331 and 333 can be sloped symmetrically with each other. As such, the ends of the seventh and ninth surfaces 331 and 333 can be, for example, joined with each other. Alternatively, the third support guide 330 can be formed with the eighth surface 332 (refer to FIGS. 7 and 8).

Figure 10:
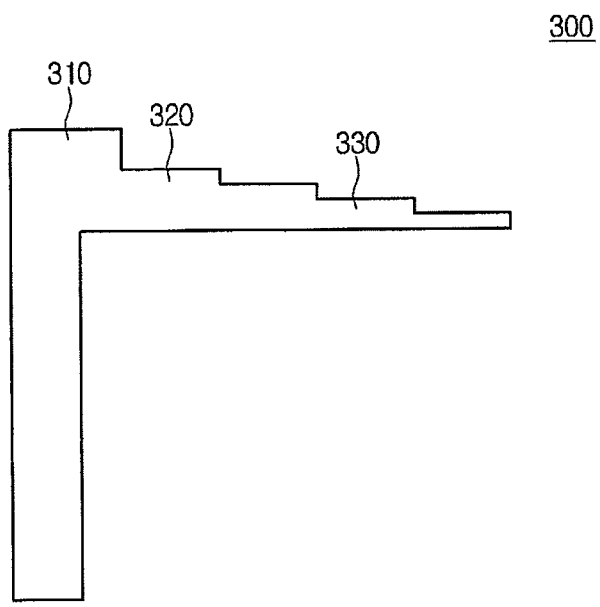

Referring to FIG. 10, the support main 300 can include first through third support guides 310, 320 and 330. The third support guide 330 can have a stair-shaped upper surface. The stair-shaped upper surface of the third support guide 330 can include, for example, three staircases. In other words, the stair-shaped upper surface of the third support guide 330 can be modified according different shapes and sizes of the LCD device 1.

FIGS. 11 through 14 are cross-sectional views showing various examples of the LCD device according to the first embodiment of the present disclosure.

Figure 11:
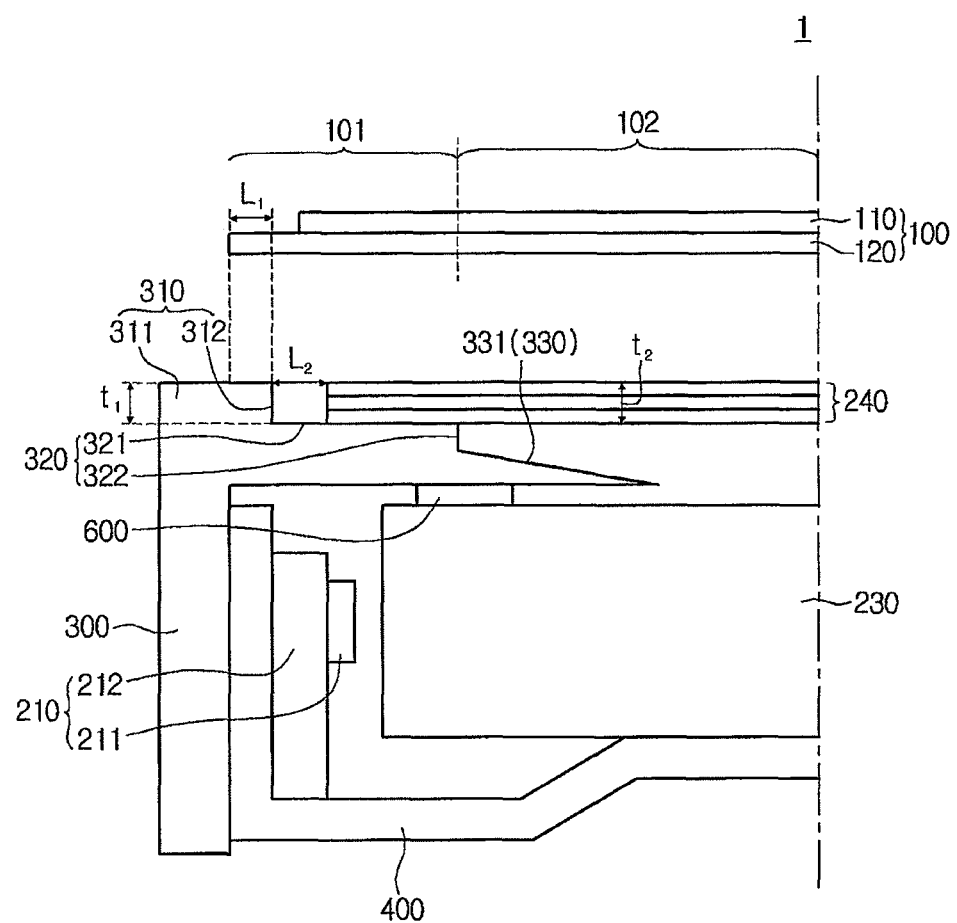
FIGS. 11 through 14 are cross-sectional views showing various examples of the LCD device according to the first embodiment of the present disclosure.

Referring to FIG. 11, the liquid crystal panel 100 can include a non-display area 101 and a display area 102 (refer to the left and right sides of the dotted line as shown in FIG. 11). The display area 102 can be used to display images, and a viewing range of a viewer corresponding to the images displayed by the display area 102 can be determined.

The support main 300 can include the first through third support guides 310, 320 and 330. The first support guide 310 can be in back of the second substrate 120 included in the liquid crystal panel 100. As such, the liquid crystal panel 100 can be disposed on the first surface 311 of the first support guide 310 which is formed in the circumference of the support main 300.

The optical sheets 240 can be in front of the fourth surface 321 of the second support guide 320. As such, the optical sheets 240 can be placed on the fourth surface 321 of the second support guide 320 which is formed in the circumference of the support main 300.

The seventh surface 331 of the third support guide 330 of the support main 300 can be sloped. Therefore, a distance from an inside portion of the optical sheets 240 to the seventh surface 331 can be larger than a distance from an outside portion of the optical sheets 240 to the seventh surface 331. In other words, the third support guide 330 near the inside of the light guide plate 230 can be thinner than the third support guide 330 near the outside of the light guide plate 230.

Meanwhile, it is preferable for the second support guide 320 to only be in the non-display area 101, and to not occupy (or overlap) the display area 102. Due to this, the fourth surface 321 of the second support guide 320 in the non-display area. If the fourth surface 321 in the display area 102 of the liquid crystal panel 100 is long, the second support guide 320 can be viewed from the front direction of the liquid crystal panel 100 of the LCD device 1. Also, light being transferred from the light guide plate 230 to the liquid crystal panel 100 can be partially shielded. As such, the picture quality of the LCD device 1 can deteriorate.

The third support guide 330 can be opposite to the display area 102 of the liquid crystal panel 100. Also, the third support guide 330 can be opposite to a part of the non-display area 101 of the liquid crystal panel 100 according to a width of the fourth surface 321 of the second support guide 320. In other words, the third support guide 330 can overlap with only a part of the display area 102 or parts of both the non-display and display areas 101 and 102 of the liquid crystal panel 100 according to the width of the fourth surface 321 of the second support guide 320.

Figure 12:
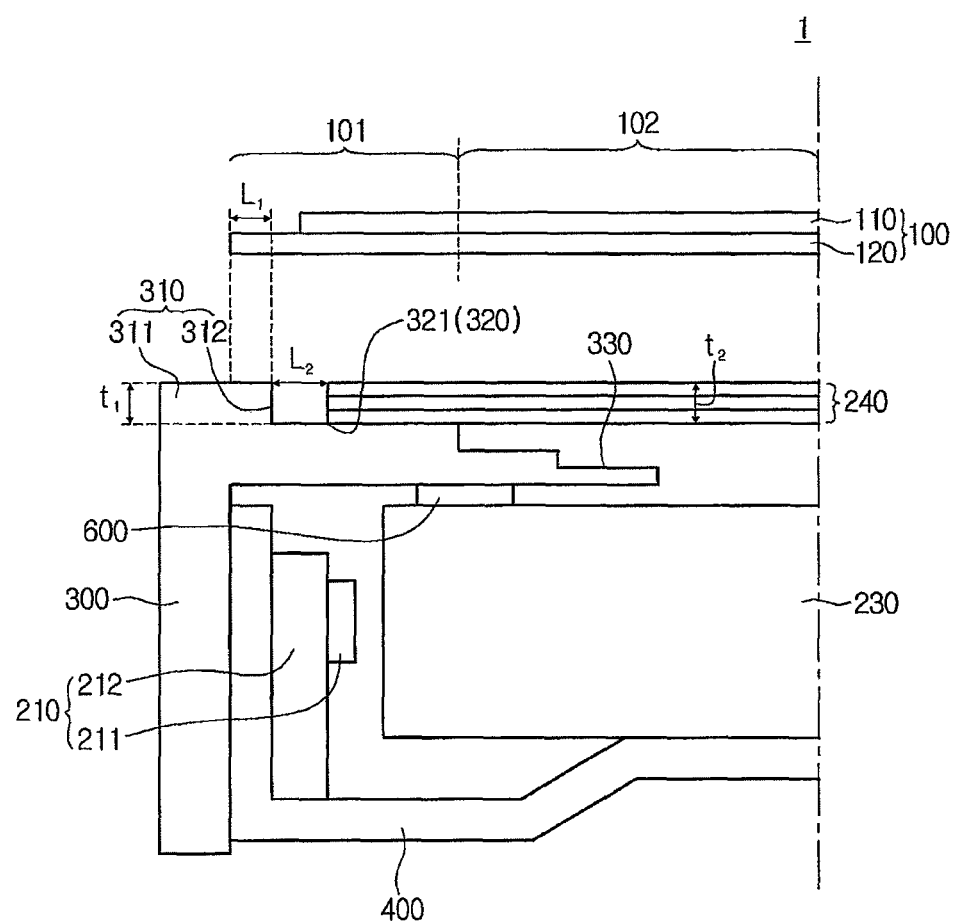

Referring to FIG. 12, one edge of the liquid crystal panel 100 can be opposite to the first surface 311 of the first support guide 310 of the support main 300. In detail, an outside portion of the second substrate 120 included in the non-display area of the liquid crystal panel 100 can overlap with a part of the first surface 311. The second substrate 120, for example, overlaps with the first surface 311 by a fixed width L1 as shown in the drawing. Alternatively, the second substrate 120 does not overlap with the first surface 311.

One edge of the optical sheets 240 can be placed on the fourth surface 321 of the second support guide 320.

The side surface of the optical sheets 240 can be spaced apart from the second surface 312 of the first support guide 310, which faces the side surface of the optical sheets 240, by a fixed distance L2. The fixed distance L2 depends on process fluctuation, and enables the optical sheets 240 to be stably received into the support main 300.

The width t1 (or height t1) of the second surface 312 of the first support guide 310 can be equal to or larger than a total thickness t2 of the optical sheets 240.

The third support guide 330 can be formed to have either a flat upper surface or a stair-shaped upper surface shown in FIG. 12. Such an upper surface of the third support guide 330 can be spaced apart from the optical sheets 240 by a fixed distance.

Figure 13:
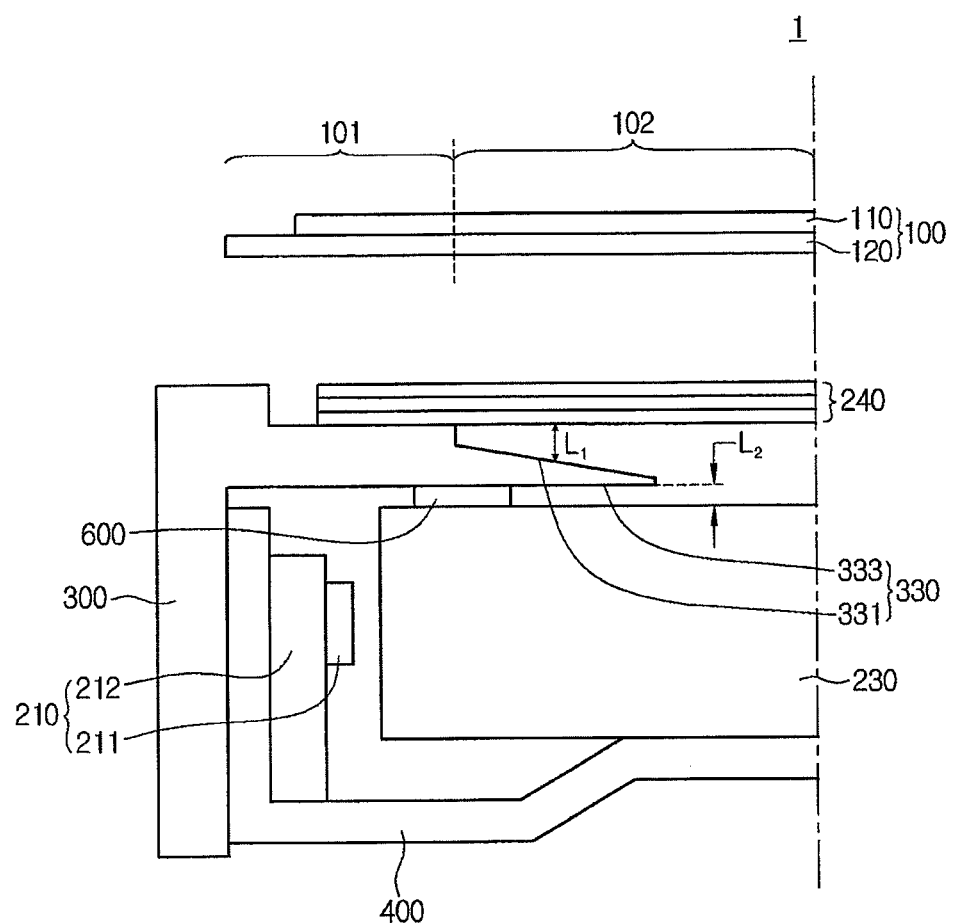

Referring to FIG. 13, the fourth surface 321 of the second support guide 320 of the support main 300 can come in contact with an rear surface of the optical sheets 240. Actually, the optical sheets 240 can be placed on the fourth surface 321, for example, without using an adhesive material. In a different way, only the rear surface of the optical sheets 240 can be attached to the fourth surface 321 using an adhesive material.

The seventh surface 331 of the third support guide 330 can be formed at a slant. Therefore, a distance from an outside portion of the optical sheets 240 to the seventh surface 331 can be larger than a distance from an inside portion of the optical sheets 240 to the seventh surface 331.

A pad 600 can be interposed between partial regions of the rear surfaces of the second and third support guides 320 and 330 and a partial region of the light guide plate 230. The pad 600 can be used to fasten the second and third support guides 320 and 330 and the light guide plate 230 to each other. The size of the pad 600 can be larger because the total area of the rear surfaces of the second and third support guides 320 and 330 is wide. As such, the support main 300 can efficiently support the light guide plate 230. Also, the third support guide 330 with the inclined seventh surface 331 can be spaced apart from the optical sheets 240 even though the third support guide 330 is formed in a region opposite to a part of the display area 102. In accordance therewith, light output from the light guide plate 230 can be evenly transferred to the entire display area 102 of the optical sheets 240 which includes edge regions. Moreover, although the third support guide 330 is opposite to the display area 102, the third support guide 330 is not viewed from the exterior of the LCD device 1 because light is effectively transferred to a space between the third support guide 330 and the optical sheets 240. In other words, the light guide plate 230 can be stably supported by the rear surfaces of the second and third support guides 320 and 330, and also light output from the light guide plate 230 can be evenly transferred throughout the display area 102. Therefore, the components within the LCD device 1 can be efficiently supported, and deterioration of picture quality can be prevented.

The pad 600 interposed between the support main 300 and the light guide plate 230 enables the support main 300 and the light guide plate 230 to be separated from each other by a fixed distance L2. The fixed distance L2 can depend on the thickness of the pad 600.

Figure 14:
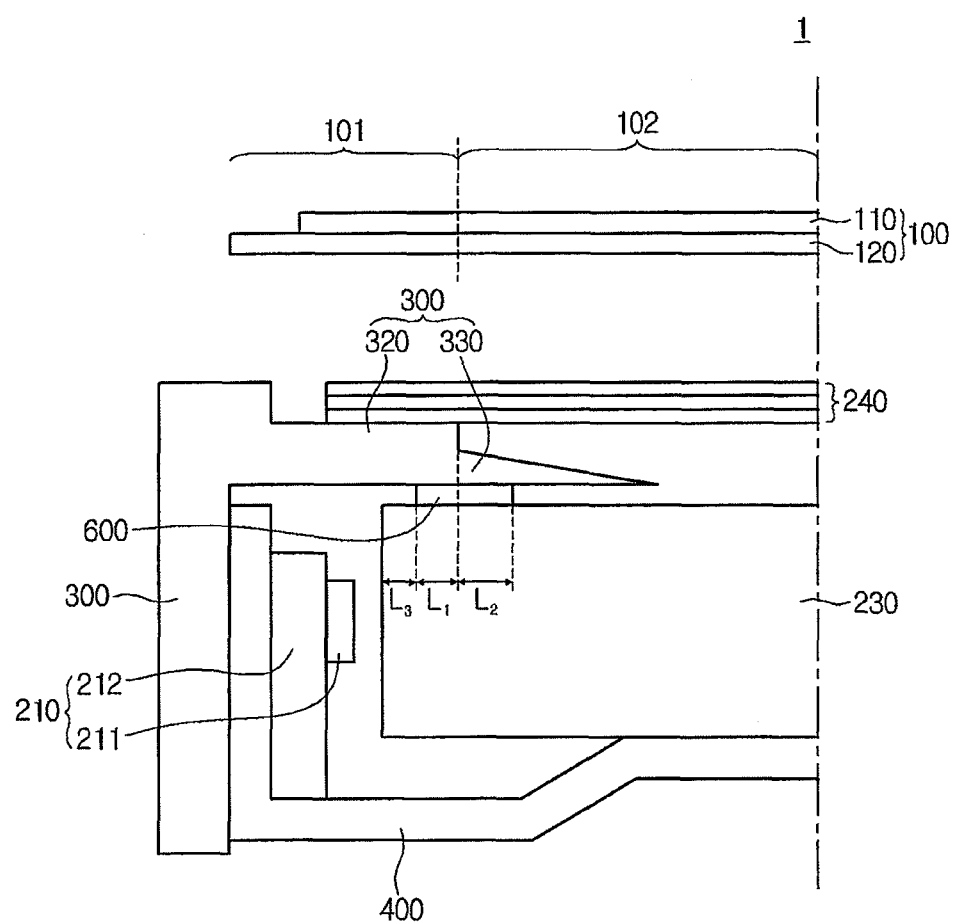

Referring to FIG. 14, a first partial region of the pad 600 corresponding to a width L1 can be adjacent to a rear surface of the second support guide 320 of the support main 300, and a second partial region of the pad 600 corresponding to another width L2 can adjacent to a rear surface of the third support guide 330 of the support main 300. However, the pad 600 is not limited to this. In other words, the pad 600 can be adjacent to only any one of the rear surfaces of the second and third support guides 320 and 330 according to the size of the LCD device 1.

The width L3 of an edge of the light guide plate 230 not overlapping with the pad 600 can be "0" or more. In other words, the pad 600 can be disposed on the edge of the light guide plate 230 according to its size or position.

The support main 300 shown in the drawings can be tinged with white or formed from a transparent material. Particularly, the third support guide 330 of the support main 300 is tinged with white or formed from the transparent material. As such, the third support guide 330 cannot be viewed from the exterior of the LCD device 1. Also, the third support guide 330 can reflect light being transferred from the light guide plate 230. In accordance therewith, light can be effectively transferred to the space between the optical sheets 240 and the third support guide 330.

In order to meet demands of viewers and enlarge a sense of immersion in a displayed image, it is necessary to reduce the bezel of the LCD device 1. In view of this point, the second support guide 320 in the display area 102 of the liquid crystal panel 100 must be reduced in comparison to in related art. The reduction of the second support guide 320 deteriorates a fixation effect of the light guide plate 230 which is supported by the rear surface of the second support guide 320, and allows the light guide plate 230 to be easily moved from a desired position. However, the light guide plate 230 can be additionally supported by the rear surface of the third support guide 330 which has the inclined upper surface. Therefore, the light guide plate 230 can be stably supported and a narrow bezel can be realized.

Figure 15:
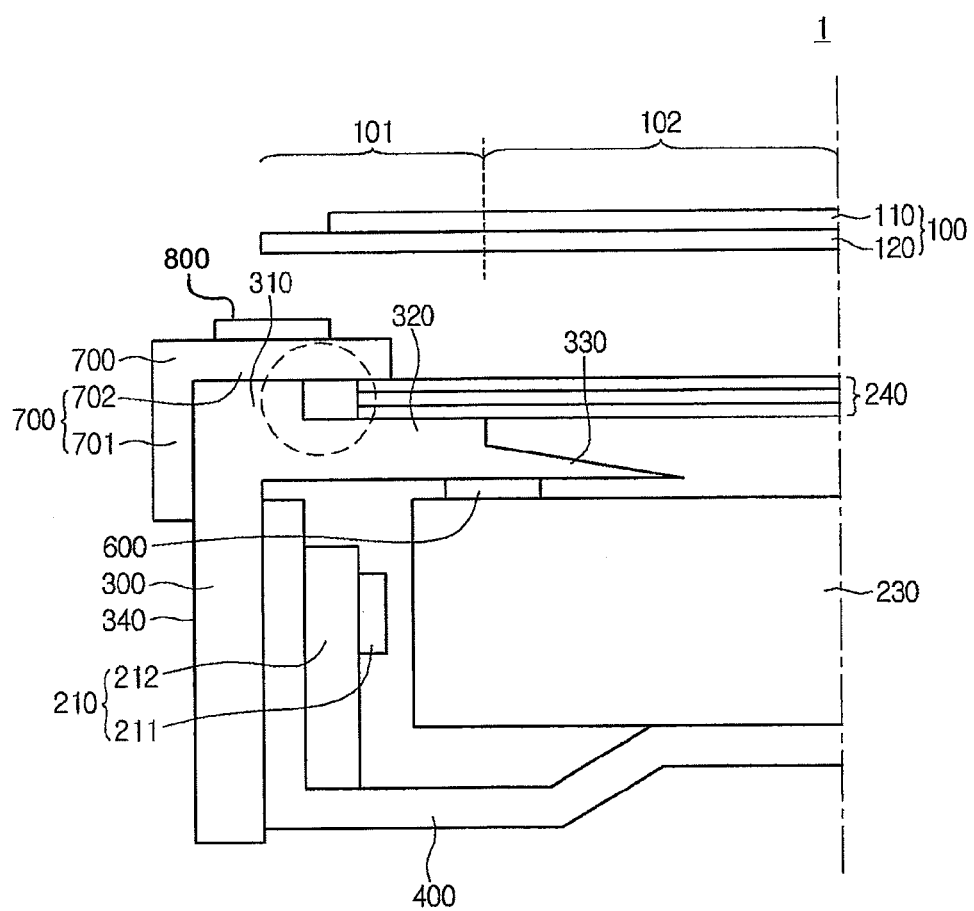
FIG. 15 is a cross-sectional view showing an LCD device according to a second embodiment of the present disclosure.

FIG. 15 is a cross-sectional view showing an LCD device according to a second embodiment of the present disclosure.

The LCD device 1 of the second embodiment is the same configuration as that of the first embodiment with the exception of a fourth support guide 700 and a second pad 800 being added to the LCD device 1. The components of the second embodiment having the same function and shape as those of the first embodiment will be referred to by the same reference numbers and names. Also, the description of the second embodiment overlapping with the first embodiment will be omitted.

Referring to FIG. 15, the LCD device 1 can further include the fourth support guide 700 configured to encompass a top portion of the support main 300 which includes the upper surface and a top region of an outer wall surface 340 of the support main 300. The fourth support guide 700 can include a first guide portion 701 and a second guide portion 702 which is formed by extending the fourth support guide 700 away from one end of the first guide portion 701 in a direction perpendicular to a direction of the first guide portion 701. The first guide portion 701 can be opposite to the outer wall surface 340 of the support main 300, and the second guide portion 702 can be opposite to the upper surface of the support main 300. The fourth support guide 700 can be combined with the support main 300 by an adhesive material or an adhesive tape. In a different way, the fourth support guide 700 can be combined with the support main 300 by one of engaging members such as a hook, a screw and so on. However, the combination of the fourth support guide 700 and the support main 300 is not limited to these.

The support main 300 can include the first through third support guides 310, 320 and 330. The second guide portion 702 can be formed in such a manner as to expand from the top end of the first guide portion 701 to a region opposite to the non-display area 101 of the liquid crystal panel 100.

Light output from light guide plates in LCD devices, in related art, can leak out through an edge of the optical sheets (through a dotted circle portion shown in the drawing). In this case, components opposite to the non-display area 101 of the liquid crystal panel 100 can be viewed from the exterior. However, the fourth support guide 700 according to the embodiments of the present invention can prevent the above-mentioned light leakage.

One edge of the optical sheets 240 are disposed adjacently to the light source (i.e., the LEDs 211). Due to this, the edge of the optical sheets 240 can be deformed by heat generated in the light source (i.e., the LEDs 211). As such, a light leakage phenomenon and misalignment of the optical sheets 240 can be generated. However, the edge of the optical sheets 240 can be supported (or pressed) by the rear surface of the second guide portion 702 of the fourth support guide 700. In accordance therewith, the above-mentioned phenomena can be minimized.

A second pad 800 can be disposed on the upper surface of the second guide portion 702 of the fourth support guide 700. The second pad 800 can be used to support the liquid crystal panel 100.

The fourth support guide 700 and the support main 300 can be formed in a single body. Alternatively, the fourth support guide 700 can be formed in such a manner as to be separate from the support main 300.

Figure 16:
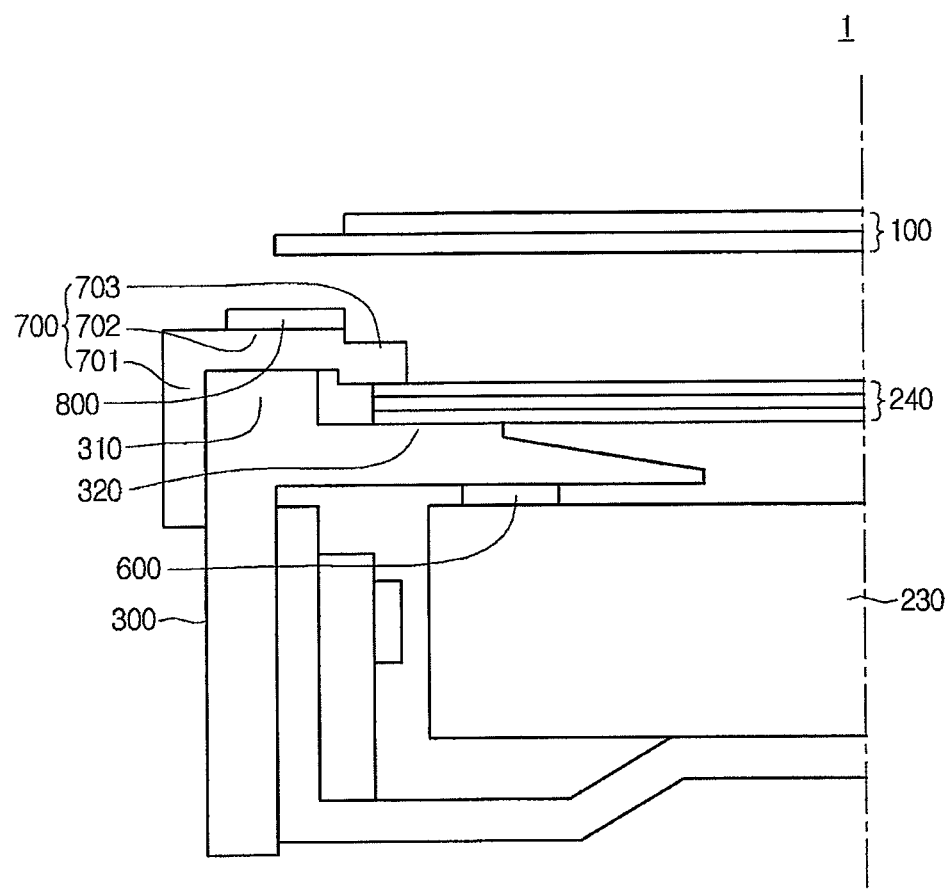
FIG. 16 is a cross-sectional view showing an LCD device according to a third embodiment of the present disclosure.

FIG. 16 is a cross-sectional view showing an LCD device according to a third embodiment of the present disclosure.

The LCD device of the third embodiment is the same configuration as those of the first and second embodiments with the exception of a fourth support guide 700 and a second pad 800 being added to the LCD device 1. The components of the third embodiment having the same function and shape as those of the first and second embodiments will be referred to by the same reference numbers and names. Also, the description of the third embodiment overlapping with the first and second embodiments will be omitted.

Referring to FIG. 16, the support guide 700 can include first through third guide portions 701, 702 and 703. The first guide portion 701 can be opposite to a top region of the outer wall surface of the support main 300. The second guide portion 702 can be opposite to the upper surface of the first support guide 310 of the support main 300. The third guide portion 703 can be opposite to the second support guide 320 of the support main 300. The fourth support guide 700 of FIG. 16 includes the second and third guide portions 702 and 703 which are formed with a stair difference therebetween or a stair shape, unlike for the fourth support guide 700 as shown in FIG. 15. The total thickness of the optical sheets 240 being placed on the second support guide 320 and the height of the first support guide 310 facing the side surface of the optical sheets 240 can be different from each other. In this case, the optical sheets 240 can be supported (or pressed) by the stair-shaped fourth support guide 700. In other words, the optical sheets 240 can come in contact with the third guide portion 703 and be stably fastened to the second support guide 320.

The second pad 800 can be disposed on the second guide portion 702 of the fourth support guide 700. The second pad 800 can be used to support the liquid crystal panel 100. As such, the liquid crystal panel 100 can be placed on the second pad 800.

Figure 17:
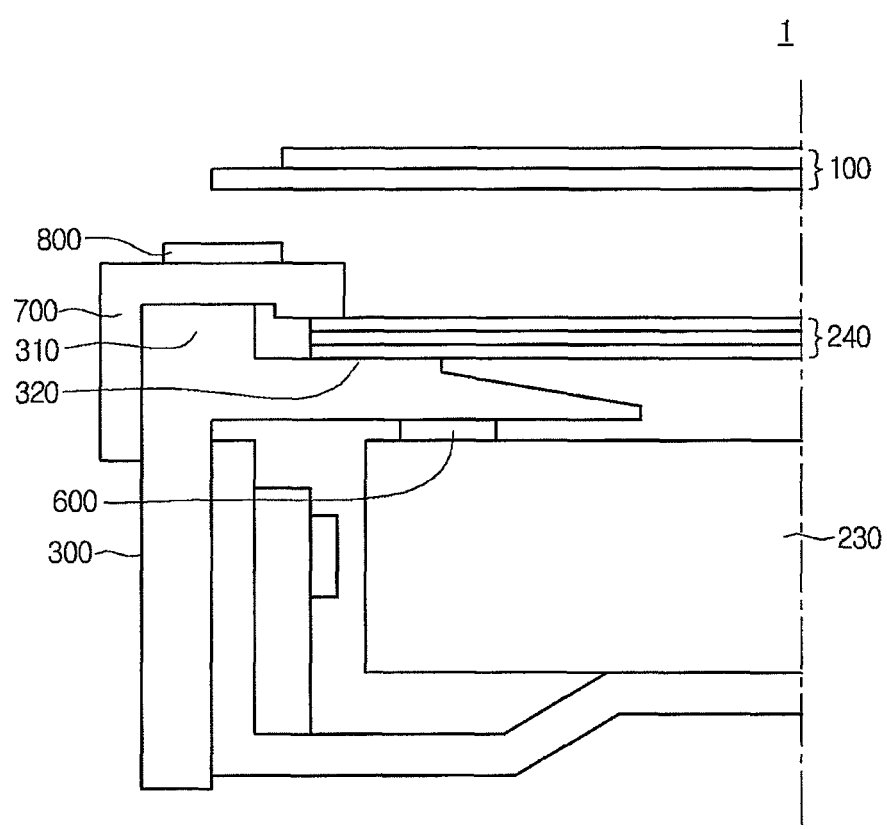
FIG. 17 is a cross-sectional view showing an LCD device according to a fourth embodiment of the present disclosure.

FIG. 17 is a cross-sectional view showing an LCD device according to a fourth embodiment of the present disclosure.

The LCD device 1 of the fourth embodiment is the same configuration as those of the first through third embodiments with the exception of a fourth support guide 700 and a second pad 800 being added to the LCD device 1. The components of the fourth embodiment having the same function and shape as those of the first through third embodiments will be referred to by the same reference numbers and names. Also, the description of the fourth embodiment overlapping with the first through third embodiments will be omitted.

Referring to FIG. 17, a rear surface of the fourth support guide 700 in front of the first support guide 310 and a rear surface of the fourth guide 700 in front of the second support guide 320 can be formed with a stair difference therebetween. The upper surface of the fourth support guide 700 can be flat without any stair difference.

The total thickness of the optical sheets 240 and the height of the side surface of the first support guide 310 facing the side surface of the optical sheets 240 can be different from each other. The optical sheets 240 can be stably supported (or fastened) by the fourth support guide 700 with the rear surface in which the stair difference is formed. The total thickness of the optical sheets 240 is illustrated smaller than the height of the side surface of the first support guide 310 opposite to the side surface of the optical sheets 240 as shown in FIG. 17, but it is not limited to this. In other words, the total thickness of the optical sheets 240 can be larger than the height of the side surface of the first support guide 310. In this case, the rear surface of the fourth support guide 700 can have a stair difference suitable for the above-mentioned condition.

The second pad 800 can be disposed on the upper surface of the fourth support guide 700. Also, the liquid crystal panel 100 can be placed on the second pad 800. Moreover, the fourth support guide 700 can be formed to have a flat upper surface. As such, a size of the second pad 800 can be larger than the size of the second pad 800 shown in FIG. 17. In other words, the liquid crystal panel 100 can be supported by the second pad 800 with a variety of sizes according to the LCD device 1.

The fourth support guide 700 and the support main 300 are illustrated without a difference of thickness in FIGS. 15 through 17, but it is not limited to this. In other words, the fourth support guide 700 can be thinner than the support main 300 on the basis of the shape and size of the LCD device 1.

Although the present disclosure has been explained regarding only the embodiments described above, it should be understood by the ordinary skilled person in the art that the present invention is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
   a liquid crystal panel in a display area and a non-display area;
   a plurality of optical sheets under the liquid crystal panel;
   a light guide plate under the optical sheets;
   a light source configured to apply light to the light guide plate; and
   a support main connected to the liquid crystal panel, the optical sheets and the light guide plate and including:
      a first support guide in back of the liquid crystal panel, wherein the first support guide extends vertically and is disposed at a side of the light guide plate;
      a second support guide extending horizontally from a side surface of the first support guide to be in back of the optical sheets and in front of the light guide plate; and
      a third support guide extending horizontally from a side surface of the second support guide and between the optical sheets and the light guide plate, wherein an inside portion of the third support guide is narrower than an outside portion of the third support guide.

2. The liquid crystal display device of claim 1, wherein the second support guide is in the non-display area, and the third support guide is in the display area.

3. The liquid crystal display device of claim 1, wherein the third support guide has a sloped front surface.

4. The liquid crystal display device of claim 1, wherein
   the first support guide includes: a first surface corresponding to a front surface of the first support guide; a second surface corresponding to a front inner side surface of the first support guide; and a third surface corresponding to a rear inner side surface of the first support guide,
   the second support guide protrudes from the second surface and includes: a fourth surface corresponding to a front surface of the second support guide; a fifth surface corresponding to an inner side surface of the second support guide; and a sixth surface corresponding to a rear surface of the second support guide,
   the third support guide protrudes from the fifth surface and includes: a seventh surface corresponding to a front surface of the third support guide; an eighth surface corresponding to an inner side surface of the third support guide; and a ninth surface corresponding to a rear surface of the third support guide,
   the liquid crystal panel is connected to the first surface,
   the optical sheets are connected to the fourth surface, and
   the light guide plate is in back of the sixth surface and the ninth surface.

5. The liquid crystal display device of claim 4, wherein the seventh surface slopes away the optical sheets toward the inside of the display area.

6. The liquid crystal display device of claim 4, wherein the seventh surface is formed to have a stair shape away from the optical sheets toward the inside of the optical sheets.

7. The liquid crystal display device of claim 4, wherein the light source is adjacent to a side surface of the light guide plate and included in a light source assembly on the third surface.

8. The liquid crystal display device of claim 4, further comprising a first pad between the support main and the light guide plate, under the sixth and ninth surfaces, and connected to the light guide plate.

9. The liquid crystal display device of claim 4, wherein the total thickness of the optical sheets is the same as the thickness of the second surface.

10. The liquid crystal display device of claim 1, wherein the first, second, and third support guides are in a single component and provided as the support main.

11. The liquid crystal display device of claim 1, wherein the second and third support guides are perpendicular to the first support guide.

12. The liquid crystal display device of claim 1, wherein the third support guide is tinged with white or formed from a transparent material.

13. The liquid crystal display device of claim 1, further comprising a fourth support guide including a first guide portion connected to an outside side surface the first support guide, and a second guide portion extending from the first support guide.

14. The liquid crystal display device of claim 13, further comprising a third guide portion extending from the second guide portion.

15. The liquid crystal display device of claim 13, wherein the optical sheets are connected to the second guide portion.

16. The liquid crystal display device of claim 15, wherein the second guide portion is in the non-display area of the liquid crystal panel.

17. The liquid crystal display device of claim 13, wherein the optical sheets are connected to the third guide portion.

18. The liquid crystal display device of claim 13, further comprising a second pad between the fourth support guide and the liquid crystal panel to support the liquid crystal panel.

19. The liquid crystal display device of claim 13, wherein the fourth support guide and the support main are formed in a single component.

20. The liquid crystal display device of claim 13, wherein the third support guide has a sloped rear surface.

* * * * *